United States Patent [19]

Seiberlich

[11] 4,436,464
[45] Mar. 13, 1984

[54] CLAMPING APPARATUS FOR A CUTTER

[75] Inventor: Walter Seiberlich, Ettlingen, Fed. Rep. of Germany

[73] Assignee: Maag Gear-Wheel & Machine Company Limited, Zurich, Switzerland

[21] Appl. No.: 304,824

[22] Filed: Sep. 23, 1981

[30] Foreign Application Priority Data

Oct. 7, 1980 [CH] Switzerland .................. 7478/80

[51] Int. Cl.³ ............................................. B23C 5/26
[52] U.S. Cl. ............................................. 409/233
[58] Field of Search ................ 409/233, 234, 232, 231

[56] References Cited

U.S. PATENT DOCUMENTS 3,242,819 3/1966 Erikson ........................... 409/233

FOREIGN PATENT DOCUMENTS 23197 1/1981 European Pat. Off. ........... 409/233
1262737 3/1968 Fed. Rep. of Germany ...... 409/234

OTHER PUBLICATIONS

Lorenz Publication Manual for "LS 150".

Primary Examiner—William R. Briggs
Attorney, Agent, or Firm—Werner W. Kleeman

[57] ABSTRACT

A clamping or chucking apparatus for a shaper cutter for a gear shaping machine, especially a generating shaping machine for fabricating gears, containing an axially to-and-fro movable ram spindle and a shaper cutter holder affixed at one end of the ram spindle and having a contact surface for the shaper cutter. A centering projection protrudes axially away from the contact surface and serves for mounting the shaper cutter. A clamping plate is attached at the end of the centering projection over a clamping mandrel or plug. The coaction of the clamping plate and clamping mandrel serves to clamp the shaper cutter against the contact surface of the shaper cutter holder. The ram spindle is hollow and contains a spring arrangement and a piston. The spring arrangement is prestressed in order to exert an axial clamping force and is operatively connected by a coupling with the shaper cutter holder or shaper cutter. The coupling is constructed to transmit the clamping force and can be easily released after elimination of such clamping force. The piston limits within the ram spindle a cylinder chamber which can be connected to a pressurized medium source and eliminates the clamping force of the spring arrangement when the cylinder chamber is pressurized.

5 Claims, 5 Drawing Figures

CLAMPING APPARATUS FOR A CUTTER

BACKGROUND OF THE INVENTION

The present invention relates to a new and improved construction of a clamping or chucking apparatus for a shaper cutter for a gear shaping machine, in particular a generating gear shaping machine for the fabrication of gears.

Generally speaking, such clamping or chucking apparatus comprises a ram spindle which can be axially displaced for to-and-fro movement and a cutter holder attached to one end of the ram spindle. The cutter holder is provided with a contact or abutment surface for the shaper cutter. Such clamping or chucking apparatus further comprises a centering projection which axially protrudes away from the contact surface of the cutter holder and serves for the fixing of the shaper cutter, and a chucking or clamping plate which is attached to one end of the centering projection by means of a checking or clamping mandrel. The clamping plate coacts with the clamping mandrel or plug for clamping the shaper cutter against the contact surface of the cutter holder.

With heretofore known clamping or chucking apparatuses of the above-mentioned type the cutter holder and the clamping mandrel are constructed of one piece and threaded to the ram spindle. The clamping mandrel is provided with external threads and the clamping plate with corresponding internal threads. Thus the clamping plate can be screwed to the chucking or clamping mandrel after the shaper cutter has been mounted upon the clamping mandrel, so that the shaper cutter is pressed against the contact surface of the cutter holder. In order to produce a sufficient clamping force a suitable tool having a long lever arm must be used for tightening the clamping plate. The forces which are thus applied by means of the tool in a more or less sudden or shock-like manner and the moments or torque which result therefrom are transmitted via the cutter holder to the ram spindle and load the guides and the drive gearing or transmission. Such guides and drive gearing are provided for the axial to-and-fro movements and the rotation of the ram spindle, respectively, and are fairly sensitive or delicate because of their required high accuracy in design. Especially for the re-grinding work it is necessary to dismantle the shaper cutters, so that the loads at the above-mentioned parts or elements, of the gear shaping machine, which are unavoidable with the heretofore known constructions of clamping apparatuses, occur rather frequently and can cause corresponding damage during the course of time. Furthermore, the prior art-clamping or chucking apparatuses of the type described above require a considerable downtime of the machine for dismantling and assembling the shaper cutter.

SUMMARY OF THE INVENTION

Therefore, it is a primary object of the present invention to provide a new and improved construction of clamping or chucking apparatus of the afore-mentioned type which is not afflicted with the afore-mentioned drawbacks and limitations of the prior art constructions discussed above.

Another and more specific object of the present invention aims at providing an improved clamping or chucking apparatus of the afore-mentioned type which facilitates and expedites the dismantling and assembling of a shaper cutter.

Now in order to implement these and further objects of the invention, which will become more readily apparent as the description proceeds, the inventive clamping or chucking apparatus is manifested by the features that the ram spindle is hollow and contains a spring arrangement and a piston. The spring arrangement is prebiased or prestressed for exerting an axial clamping force and is operatively connected to the cutter holder or the shaper cutter by means of a coupling which is constructed such that it transmits such clamping force and can be easily released after the chucking or clamping force has been eliminated or neutralized. Within the ram spindle the piston delimits a cylinder chamber which can be connected to a pressure medium source. When the cylinder chamber is pressurised the piston eliminates the clamping force of the spring arrangement.

A torque or moment, which could particularly impair the precision of the generating gearing of a generating gear shaping machine, does not need to be applied for exchanging the shaper cutter at a shaping machine which is equipped with a clamping apparatus constructed according to the invention, because owing to the prebiasing or prestressing of the spring arrangement the required axial clamping force is already present and is only neutralized by means of the pressure medium for the duration needed for exchanging the shaper cutter. Since the spring arrangement and the piston and cylinder chamber limited by the piston are arranged internally of the ram spindle, neither the spring arrangement nor the piston generate an external force which loads or strains the guides or the drive elements of the ram spindle. Therefore, the gear shaping machine maintains its original working or machining accuracy over a long period of time. The operator of the machine can exchange the shaper cutter without any great effort and thus rapidly. Consequently, the related downtimes of the machine can be kept short.

According to one embodiment of the invention a part of the coupling is arranged at the cutter holder itself. After the annihilation or neutralization of the clamping force, the cutter holder can be detached from the ram spindle together with the clamping mandrel or plug, the clamping plate and the shaper cutter. With this embodiment of the invention the shaper cutter can be secured to the cutter holder in conventional manner, in that the clamping mandrel or plug and the cutter holder are constructed as one piece or integrally and threadably connected to the chucking or clamping plate. Thus, the shaper cutter is chucked or clamped between the contact surface of the cutter holder and the clamping plate. Under certain circumstances such chucking or clamping action need not even be released for re-grinding or sharpening the shaper cutter. However, if this should prove necessary, it can be performed away from the machine, which meanwhile can be equipped with another cutter holder and shaper cutter and can continue with its work.

According to another embodiment of the invention a part of the coupling is arranged at the clamping mandrel or plug which is guided to be axially displaceable in the cutter holder. In this case the cutter holder normally remains fixedly connected to the ram spindle, for instance screwed or threaded thereto, when the shaper cutter is exchanged.

With the two above-described embodiments of the invention the spring arrangement preferably is a package of plate springs through which extends a piston rod secured to the piston. Thus, it is possible to make use of the known property or characteristic of packages of plate springs, namely the possibility to adapt their force-displacement characteristic to alternating or varying requirements by suitably choosing the size, number and arrangement of the individual plate springs.

Both above-described embodiments of the invention are preferably further augmented by the provision of an axially displaceable differential piston arrangement which is additionally arranged internally of the ram spindle. The smaller effective piston surface of such differential piston arrangement defines a chamber which is under a pressure generated by the spring arrangement. This chamber communicates with a second chamber which is limited by the larger effective piston surface of the differential piston arrangement which faces the free end of the clamping mandrel or plug. Such further development of the invention has the advantage that the axial chucking or clamping force, which with the first embodiment acts upon the cutter holder and with the second embodiment upon the clamping mandrel, is intensified with respect to the force of the spring arrangement by a factor which corresponds to the relationship of the two effective piston surfaces.

BRIEF DESCRIPTION OF THE DRAWINGS

The invention will be better understood and objects other than those set forth above will become apparent when consideration is given to the following detailed description thereof. Such description makes reference to the annexed drawings which depict exemplary embodiments of the invention and wherein.

DETAILED DESCRIPTION OF THE PREFERRED EMBODIMENTS

Figure 1:
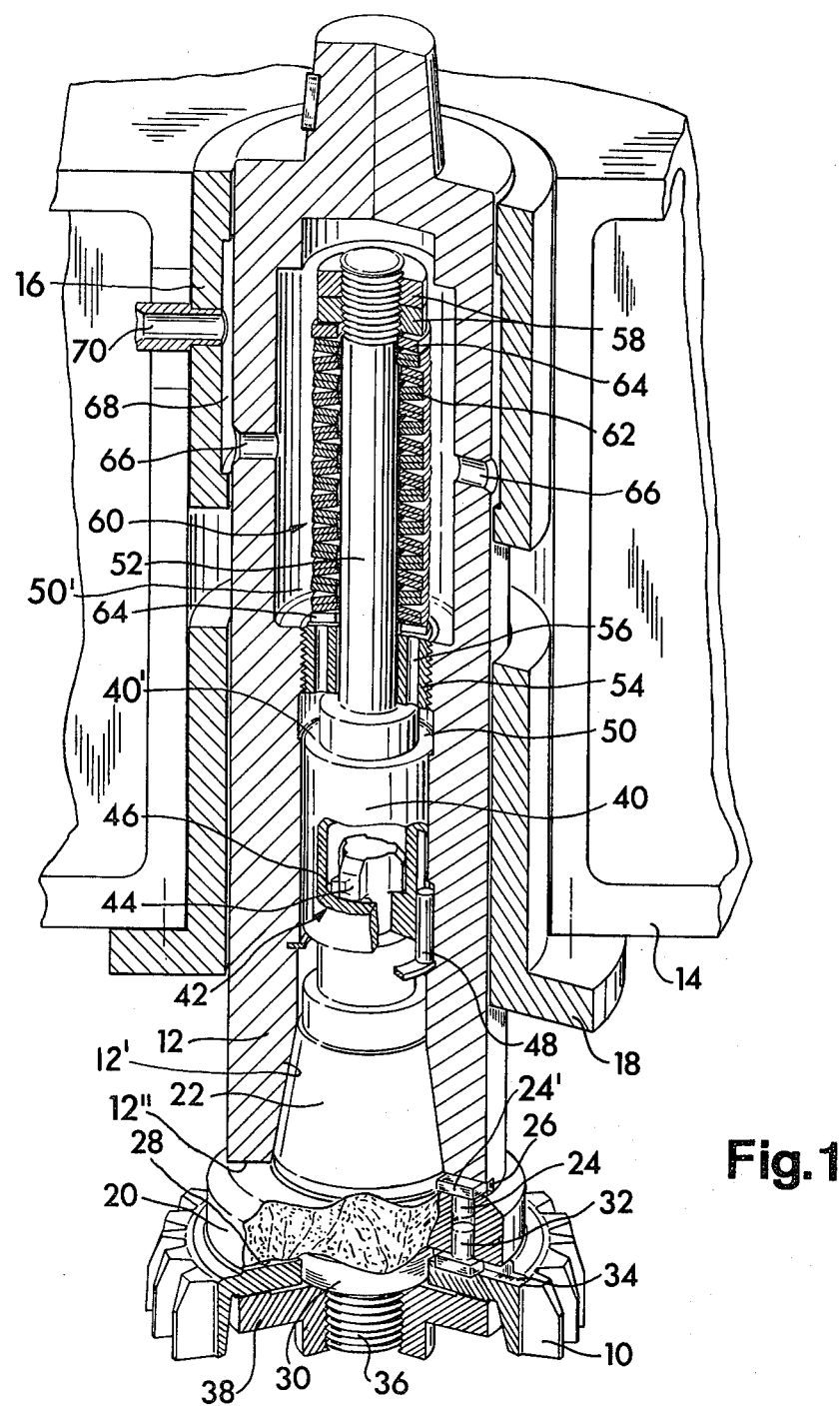
FIG. 1 is an axial sectional view of a ram spindle for a generating gear shaping machine including the neighboring components and illustrating a first embodiment of the clamping or chucking apparatus according to the invention.

Describing now the drawings, in all of the herein illustrated embodiments and variants the clamping or chucking apparatus of the invention is assigned the task of providing a rigid or fixed but easily and rapidly releasable connection between a shaper cutter 10, which serves for generating shaping externally teethed gears in the illustrated examples, and a ram spindle 12 of a generating gear shaping machine. The ram spindle 12 is guided to be axially displaceable in a shaping or ram head 14 of the gear shaping machine by means of two guide bushings or sleeves 16 and 18 which are mounted in the shaping or ram head 14. For the axial to-and-fro displacement movements and the rotation of the ram spindle 12 there are provided conventional drive means which are therefore not particularly illustrated in detail in the drawings.

At a shaper cutter holder 20 there is formed a centering body or element 22 which engages into a corresponding bore section 12' in the lower portion or end region of the ram spindle 12 which is drilled or otherwise machined to be hollow throughout its entire length. Thus, the centering body 22 centers the cutter holder 20 in a most accurate manner with respect to the ram spindle 12. With the embodiment according to FIG. 1, the centering body 22 and the related bore section 12' of the ram spindle 12 have a substantially conical shape. Inserted into the cutter holder 20 and arranged substantially axially parallel thereto is a fitting bolt 24 which engages into a radial slot or keyway 26 provided at the lower end face 12" of the ram spindle 12, so that the cutter holder 20 is arrested in its position. Thus, a precise positional correlation between the cutter 10 and the workpiece or blank can be achieved.

On its side facing away from the ram spindle 12 the cutter holder 20 is provided with a contact surface 28 normal to the lengthwise axis of the ram spindle 12 and a centering projection 30 for the shaper cutter 10, as can be best seen by referring to the lower portion of the drawings of FIG. 1. The cutter holder 20 further comprises another axially parallel fitting bolt 32 which engages into a radial slot or keyway 34 of the shaper cutter 10, so that such shaper cutter 10 is located in a predetermined position with respect to the centering body 22.

From the centering projection 30 there protrudes axially downwards a clamping mandrel or plug 36 which piercingly extends through the shaper cutter 10 and carries a chucking or clamping plate 38 which maintains the shaper cutter 10 clamped between itself and the contact surface 28 of the cutter holder 20. With the embodiment according to FIG. 1, the chucking or clamping mandrel 36 and the cutter holder 20 are constructed as one piece in conventional manner and are threadably connected or screwed to the chucking or clamping plate 38, which is therefore formed in this case substantially like a nut member in the embodiment under discussion.

Guided in the hollow ram spindle 12 is a piston or piston member 40 which is connected to the cutter holder 20 by means of a rapidly releasable coupling or coupling means 42 which is formed as a substantially bayonet-like closure or fastening device for transmitting axial tension or tractive forces. According to the arrangement of FIG. 1, the coupling 42 is formed by a bayonet pin 44 or equivalent structure which is arranged at the upper end of the cutter holder 20 and a complementary recess or opening 46 formed at the piston 40. In an angular position which is turned by 90° with respect to the position shown in FIG. 1, the bayonet pin 44 can be inserted into the recess 46 when the piston 40 has reached its lower terminal or end position. By subsequently turning through 90° the cutter holder 20 reaches the position indicated in FIG. 1 and there is established a tension-proof connection between the piston 40 and the cutter holder 20 and the head 24' of the fitting bolt 24 of the cutter holder 20 engages into the related slot or keyway 26 of the ram spindle 12. By means of a pin or bolt 48 or the like which is arranged in an axially parallel orientation within the ram spindle 12, the piston 40 is kept from rotating in relation to the ram spindle 12.

With its upper end face 40' the piston 40 delimits a cylinder chamber 50 within the ram spindle 12. This piston or piston member 40 is provided with a piston rod 52 which extends upwards through an insert member or insert 54 which is threaded into the ram spindle 12. The insert 54 is provided with axially extending substantially parallel channels 56, so that the cylinder or compartment chamber 50 flow communicates with a space or chamber 50' located above the insert 54. Threaded or otherwise appropriately affixed to the upper end of the piston rod 52 are nuts or nut members 58 which maintain clamped between themselves and the insert 54 a spring arrangement 60 having a considerable prebiasing or prestressing for instance 600 kp. In all exemplary embodiments shown in the drawings, the spring arrangement 60 is composed, for instance, of a number of plate springs 62 and two intermediate disks 64.

The space or chamber 50' which flow communicates with the cylinder chamber 50 and contains the spring arrangement 60 is connected to a pressure medium connection or stud 70 of a standard source of pressurised medium by means of radial channels or bores 66 provided in the ram spindle 12 and an annulus or annular space 68 located in the upper guide bushing or sleeve 16. The pressure medium connection 70, as stated, can be connected to a herein not particularly illustrated but conventional pressure medium source.

As long as no pressure is present in the cylinder chamber 50, the entire prebiasing or prestressing force of the spring arrangement 60 is transmitted via the piston rod 52 and the coupling 42 to the cutter holder 20 in the form of a force which is directed axially upwards. Thus, the cutter holder 20 and together therewith the shaper cutter 10 are clamped to the ram spindle 12. However, if the cylinder chamber or compartment 50 is placed under a pressure which emanates from the above-mentioned pressure medium source and causes a downwardly directed force to impinge upon the piston 40 and which force is greater than the prebiasing force of the spring arrangement 60, then the piston 40 and together therewith the coupling 42 move downwards. Thus, the cutter holder 20 together with the shaper cutter 10 can easily be turned or rotated through 90° and removed from the ram spindle 12.

Figure 3:
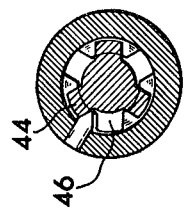
FIG. 3 is a radial sectional view, taken substantially along the line III—III of FIG. 2.
Figure 2:
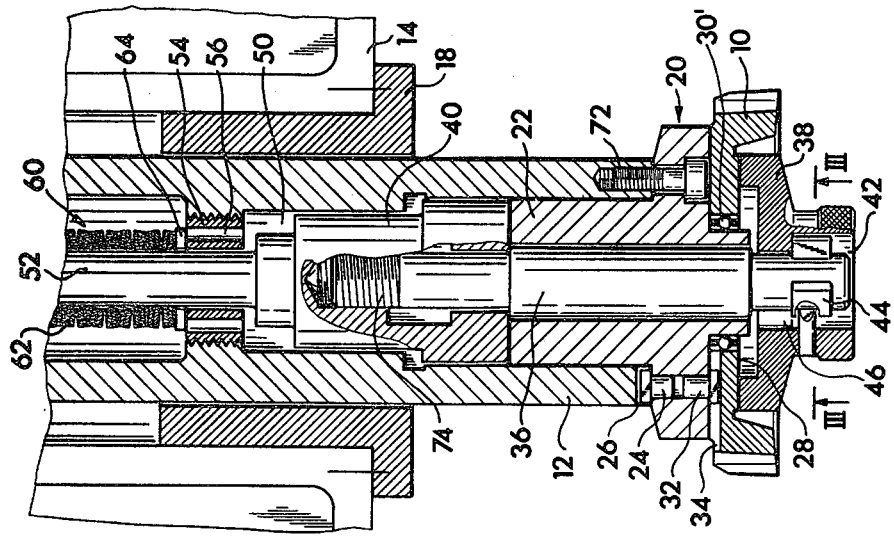
FIG. 2 is a corresponding fragmentary axial sectional view of the lower portion of the ram spindle equipped with a second embodiment of clamping or chucking apparatus according to the invention.

The embodiment illustrated in FIGS. 2 and 3 differs from that of FIG. 1 primarily in that here the cutter holder 20 is provided with a substantially cylindrical centering body 22 and is screwed or threadably connected to the lower end of the ram spindle 12 by means of screws or threaded bolts 72 or the like, of which only one has been shown in the drawings. Another important difference in relation to FIG. 1 exists in the fact that here the clamping mandrel or plug 36 is constructed as a separate component or element. This clamping mandrel or plug 36 is guided to be axially displaceable in the cutter holder 20, extends therethrough in an upward direction and with its upper end is threaded or screwed into the piston 40. With this embodiment, the rapidly releasable coupling 42 is formed by a bayonet pin 44 provided at the lower end of the chucking or clamping mandrel 36 and a complementary recess 46 or the like provided in the chucking or clamping plate 38. Thus, the coupling 42 connects the piston 40 via the clamping plate 38 and the shaper cutter 10 with the cutter holder 20, rather than directly connecting such piston 40 with the cutter holder 20. All components or elements which are arranged above the piston 40 are arranged and constructed in the same manner as previously illustrated and described in connection with FIG. 1 and are therefore only partially illustrated in FIG. 2.

With the embodiment according to FIGS. 2 and 3 the force which is exerted by the spring arrangement 60 upon the piston rod 52 in axial upward direction, is transmitted from the piston 40 to the chucking or clamping mandrel 36, from that location via the coupling 42 and the clamping plate 38 to the shaper cutter 10 and from there finally to the cutter holder 20. For exchanging the shaper cutter 10, as likewise was described with reference to FIG. 1, the cylinder chamber 50 is placed under pressure by the pressure medium source, so that the piston 40 overcomes the clamping force of the spring arrangement 60 and downwardly displaces the chucking or clamping mandrel 36. A minimal displacement is sufficient for neutralizing or eliminating the effect of the clamping force which acts upon the coupling 42. Thereafter, the clamping plate 38 can be effortlessly turned through 90° with respect to the position indicated in FIG. 2 and downwardly removed away from the clamping mandrel or plug 36. At the same time or thereafter the shaper cutter 10 can be downwardly detached from the centering body 22. Such detachment is facilitated in that the massive centering projection 30 shown in FIG. 1 has been here replaced by a ball-bearing or ball guide 30' which centers the shaper cutter 10 with respect to the cutter holder 20.

Figure 4:
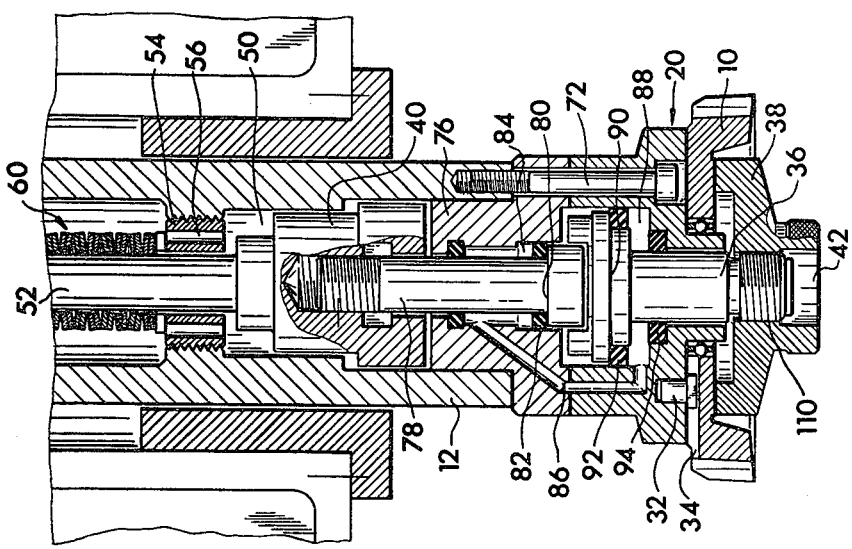
FIG. 4 illustrates a further development of the embodiment illustrated in FIG. 2, likewise shown in axial sectional view through the lower portion of the ram spindle.

The embodiment according to FIG. 4 differs from the embodiment shown in FIGS. 2 and 3 in that here the coupling 42 between the lower end of the clamping mandrel or plug 36—also may be referred to as a spindle—and the clamping plate 38 is formed by a threaded connection, generally indicated by reference character 110. Although this threaded connection 110 does not need to be constructed in a different way than with comparable or similar clamping or chucking apparatuses of the prior art, it nonetheless forms a rapidly and easily releasable coupling, because in this case the threaded connection 110 can be relieved from any axial chucking or clamping force, since the cylinder chamber or compartment 50 is placed under pressure in the afore-described manner.

The embodiment according to FIG. 4 further differs from the embodiment shown in FIGS. 2 and 3 in that in this case the cutter holder 20 is not directly bolted or threadably connected to the ram spindle 12, but rather by means of a bushing-shaped or sleeve-like intermediate element 76. Extending through this intermediate element 76 is a traction or tension rod 78 which at its upper end is permanently screwed into the piston 40. At the neighborhood of its lower end the intermediate element 76 is provided with a substantially ring-shaped or annular piston surface 80 which faces away from the clamping mandrel or spindle 36, i.e. is here directed upwards with respect to the showing of FIG. 4. The piston face or surface 80, or rather more exactly stated a substantially ring-shaped or annular seal 82 which is arranged forwardly thereof, bounds a space or chamber 84 within the intermediate element 76. By means of channels 86 provided in the intermediate element 76 and the cutter holder 20 this space or chamber 84 flow communicates with a space or chamber 88 arranged within the cutter holder 20. The upper end of the space or chamber 88 is bounded by a substantially ring-shaped or annular piston surface or face 90 and a forwardly arranged seal 92 respectively, which faces the shaper cutter 10, i.e. is here directed downwards with respect to the showing of FIG. 4. The piston surface or face 90 is formed at the clamping mandrel 36 and is larger in size by a multiple than the size of the piston surface 80. The lower end of the space or chamber 88 is closed by a further seal 94 which is supported by the cutter holder 20. The chambers 84 and 88 and the channels 86 are entirely filled with an incompressible pressure medium, e.g. "Mipolam", and form a self-contained system which constitutes a hydraulic pressure intensifier or pressure step-up system.

If the cylinder chamber 50 is pressureless and the clamping force of the spring arrangement 60 therefore is a tension or tractive force which is directed upwards and transmitted from the piston rod 52 to the traction rod 78, the piston surface 80 of the traction rod 78 exerts a pressure upon the liquid medium in the chamber 84. This pressure propagates to the chamber 88 and acts upon the larger piston surface or face 90. As a result, the chucking or clamping mandrel 36 is pushed upwards by a force which is a multiple of the clamping force exerted by the spring arrangement 60. Such increased force is transmitted via the coupling 42 to the clamping plate 38, so that the same clamps the shaper cutter 10 to the cutter holder 20 by means of a force which is correspondingly intensified with respect to the embodiment according to FIGS. 2 and 3.

Figure 5:
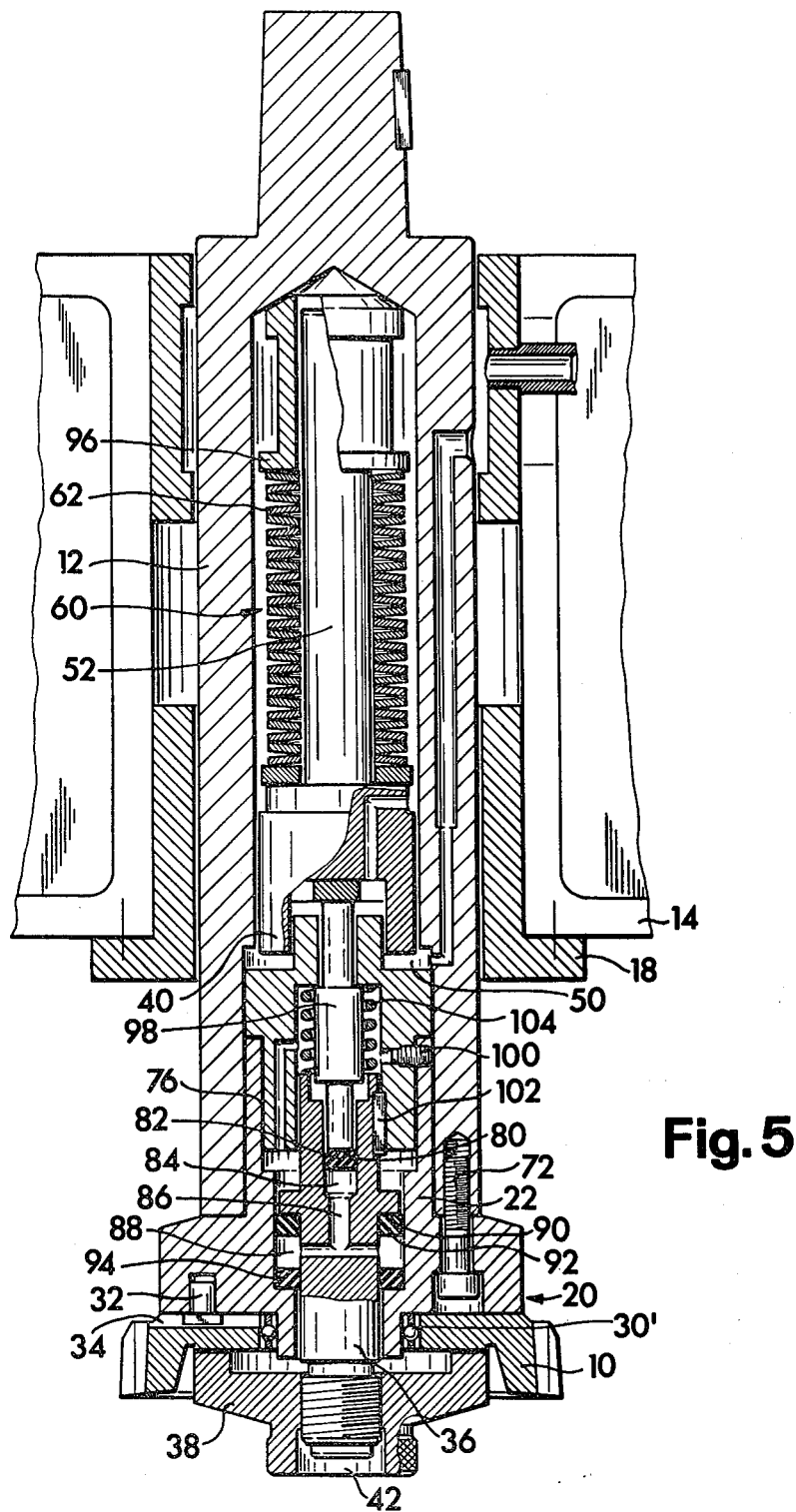
FIG. 5 is a variant of the arrangement of FIG. 4, depicting in axial sectional view the entire ram spindle.

The embodiment according to FIG. 5 differs from the heretofore described embodiments in the first instance in that there are here omitted the insert 54 located above the piston 40 and the nuts 58 which are arranged at the upper end of the piston rod 52. The upper end of the piston rod 52 is guided to be axially displaceable in a bushing or sleeve 96 which is arranged internally of the ram spindle 12 and supported at its upper end at this ram spindle 12. The spring arrangement 60 is clamped between the bushing or sleeve 96 and the piston 40, upon which it exerts a clamping force which is directed axially downwards. When the apparatus is in operation, this clamping force is transmitted to an axially arranged pressure rod or bar 98. According to the showing of FIG. 5, the lower end of the pressure rod 98 is guided to be axially displaceable in the clamping mandrel 36 and its upper end is likewise guided for axial movement in the substantially bushing-shaped intermediate element 76. The clamping mandrel or spindle 36, in turn, is guided to be axially displaceable in the intermediate element 76. This intermediate element 76 is prevented from performing axial displacements with respect to the ram spindle 12 in that it is screwed to the cutter holder 20. An involuntary release of this threaded connection is prevented by means of a radially arranged stud screw 100 or equivalent structure. By means of a fitting spring 102 the clamping mandrel 36 is prevented from rotating with respect to the intermediate element 76, and thus, with respect to the ram spindle 12. Axially clamped between the clamping mandrel 36 and the intermediate element 76 is a pressure spring 104 which has the tendency to downwardly displace the clamping mandrel 36.

According to the embodiment of FIG. 5, the chucking or clamping force of the spring arrangement 60 which is directed axially downwards is transmitted from the piston 40 to the pressure rod or bar 98. The lower end face of the pressure rod or bar 98 acts as the smaller piston face or surface 80 and via a forwardly located seal 82 pressurizes a medium or liquid contained in chamber 84, as previously described with reference to the embodiment according to FIG. 4. In the same manner as with the embodiment of FIG. 4, here also the pressure propagates through channels 86 to the space or chamber 88 and acts upon a larger piston surface or face 90 which faces the shaper cutter 10, and thus, is directed downwards according to the showing of FIG. 5. Thus a correspondingly intensified chucking or clamping force is transmitted via the coupling 42 to the clamping plate 38, and from there via the shaper cutter 10 finally to the cutter holder 20. By means of this force the shaper cutter 10 is positively clamped at the cutter holder 20 and connected to the ram spindle 12. Just as in the embodiment according to FIGS. 2 to 4, the threaded screws or bolts 72 in the embodiment according to FIG. 5 are only of importance in the event that the cylinder chamber or compartment 50 is pressurized and as a result thereof the clamping force of the spring arrangement 60 at the clamping mandrel or spindle 36 is therefore not effective.

While there are shown and described present preferred embodiments of the invention, it is to be distinctly understood that the invention is not limited thereto but may be embodied and practiced within the scope of the following claims. ACCORDINGLY,

What I claim is:

1. A clamping apparatus for a shaper cutter for a gear shaping machine, in particular a generating gear shaping machine for the production of gears, comprising:
    a to-and-fro axially displaceable ram spindle;
    a cutter holder provided at one end of said ram spindle;
    said cutter holder possessing a contact surface for the shaper cutter;
    means protruding axially away from said contact surface;
    said protruding means serving for attachment of said shaper cutter;
    a clamping plate secured to an end of said protruding means;
    a clamping mandrel securing said clamping plate to said end of said protruding means;
    said clamping plate and said clamping mandrel coacting with each other for clamping said shaper cutter at said contact surface of said cutter holder;
    said ram spindle being hollow;
    a spring arrangement arranged in said hollow ram spindle;
    a piston arranged in said hollow ram spindle;
    means for prebiasing said spring arrangement to exert an axial clamping force;
    a coupling constructed such as to transmit said axial clamping force;
    said coupling including means for easily releasing said coupling after the elimination of said clamping force;
    said spring arrangement being connected to said cutter holder or shaper cutter by means of said coupling;
    said piston defining a pressure chamber within said ram spindle and which is capable of connection with a pressure medium source; and
    means for pressurizing said pressure chamber to thereby eliminate said clamping force of said spring arrangement by means of said piston.

2. The clamping apparatus as defined in claim 1, wherein:
    a part of said coupling is formed at said cutter holder; and said cutter holder being removable from said spindle together with said clamping mandrel, said clamping plate and said shaper cutter after the elimination of said clamping force.

3. The clamping apparatus as defined in claim 1, wherein:
a part of said coupling is formed at said clamping mandrel; and
said clamping mandrel being guided to be axially displaceable in said cutter holder.

4. The clamping apparatus as defined in claim 1, wherein:
a plate spring package forms said spring arrangement;
a piston rod extending through said spring package; and
said piston rod being secured to said piston.

5. The clamping apparatus as defined in claim 1, wherein:
said ram spindle further contains an axially displaceable differential piston arrangement;
said differential piston arrangement having a smaller piston surface delimiting a first chamber;
said first chamber being under a pressure generated by said spring arrangement;
said differential piston arrangement having a larger effective piston surface;
said larger effective piston surface of said differential piston arrangement facing a free end of said clamping mandrel delimiting a second chamber; and
said second chamber flow communicating with said first chamber.

* * * * *